United States Patent [19]

Strutzel

[11] Patent Number: 4,659,599
[45] Date of Patent: Apr. 21, 1987

[54] POLYAMIDE-BASED TUBULAR PACKAGING FILM

[75] Inventor: Hans Strutzel, Wiesbaden, Fed. Rep. of Germany

[73] Assignee: Hoechst Aktiengesellschaft, Frankfurt am Main, Fed. Rep. of Germany

[21] Appl. No.: 781,904

[22] Filed: Sep. 30, 1985

[30] Foreign Application Priority Data

Oct. 5, 1984 [DE] Fed. Rep. of Germany ....... 3436682

[51] Int. Cl.$^4$ ............................................. F16L 11/00
[52] U.S. Cl. .................... 428/36; 138/118.1; 426/105; 426/135
[58] Field of Search ...................... 428/36; 138/118.1; 426/105, 135

[56] References Cited

U.S. PATENT DOCUMENTS

| 3,826,676 | 7/1974 | Heling et al. | 138/118.1 |
| 4,035,569 | 7/1977 | Schweiger | 525/58 |
| 4,243,074 | 1/1981 | Strutzel et al. | 138/118.1 |
| 4,303,711 | 12/1981 | Erk et al. | 428/36 |
| 4,442,868 | 4/1984 | Smith et al. | 428/36 |
| 4,486,507 | 12/1984 | Schumacher | 428/476.1 |
| 4,550,025 | 10/1985 | Vrouentaets | 426/135 |
| 4,560,520 | 12/1985 | Erk et al. | 138/118.1 |

FOREIGN PATENT DOCUMENTS

| 511195 | 7/1980 | Australia. | |
| 0113136 | 7/1984 | European Pat. Off. . | |
| 2657833 | 6/1978 | Fed. Rep. of Germany ... | 138/118.1 |

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

A tubular packaging film, in particular a sausage casing for scalded and cooked sausages. The polymer mixture of said film has, on a 100 parts polymer basis, from 30 to 90 parts by weight homopolyamide or copolyamide, and from 70 to 10 parts polyterephthalic acid ester and/or copolyester of terephthalic and isophthalic acid units. The polyester is formed with an aliphatic or alicyclic diol. The film also optionally contains additives such as silicone oils which improve slip properties.

18 Claims, No Drawings

POLYAMIDE-BASED TUBULAR PACKAGING FILM

BACKGROUND OF THE INVENTION

The present invention relates to a tubular packaging film, useful in particular as a sausage casing for scalded and cooked sausages, which is constructed of polyamide, and which has improved physical properties compared with known polyamide tubings. While the film can advantageously be used for packaging purposes, it is especially suitable for use as a crease-free and deformation-resistant sausage casing for scalded and cooked sausages.

A great number of tubular films comprising synthetic plastic materials, for example, polyester or polyamide, are known in the art. But in sausage casings, above all, stringent requirements must met with regard particularly to their suitability from a physiological point of view, their strength, and dimensional stability.

Tubular films made of a variety of synthetic materials have the drawback of reduction in strength if water is absorbed. In many cases, the packaged material contains water and gives off moisture to the adjoining packaging film. Reduction of film strength is particularly apparent in the course of scalding or cooking of tubular casings filled with sausage meat, when the film material comes into contact with hot water or steam. The strength of the film material thereby decreases sharply due to the absorption of water.

Sausages can be treated with hot steam by being suspended by a string loop in a cooking cabinet. During this process, the lower portion of the sausage casing is heavily loaded by the weight of the filled-in sausage meat. If the casing material has insufficient dimensional stability, it then expands, such that the originally cylindrical sausage turns into a deformed pearshaped product.

To compensate for this unwelcome effect, the thickness of the packaging film has hitherto been increased correspondingly or, alternatively, attempts have been made to enhance the film strength by expensive process steps during tubing manufacture.

The strength of the casing material, however, which is reduced at the cooking or scalding temperature, can only be improved by these measures to a limited extent, and thus the deformation resistance of the casing material at this temperature is therefore only slightly increased. An excessive thickness of the casing material also involves the risk that the packaging casing becomes too rigid and inelastic. The casing can then only insufficiently expand when the filling is pressed in, and after the cooking or scalding process, it does not fully conform to the shrunken contents in the cooled state, so that the product obtained is wrinkled and unattractive.

SUMMARY OR THE INVENTION

It is accordingly an object of the present invention to provide a tubular packaging film, useful, for example, as a sausage casing for scalded and cooked sausages, which is capable of satisfying the high requirements relating to dimensional stability upon treatment with hot water or steam.

It is another object of the invention to provide a tubular packaging film, as above, which provides for a crease-free appearance after high-temperature treatment and subsequent cooling of the film and of the product contained in the film.

These objects are achieved by a polymer mixture useful as a tubular packaging film, which comprises, on a 100 parts polymer basis, from about 30 parts to about 90 parts of a polyamide selected from the group consisting of homopolyamides, copolyamides, and mixtures thereof, and from about 70 parts to about 5 parts of a polyester having repeating units selected from the group consisting of terephthalic acid and a mixture of terephthalic and isophthalic acids.

DETAILED DESCRIPTION OF THE PREFERRED EMBODIMENTS

The tubular packaging film of the invention is formed of a single layer and substantially comprises a polymer mixture having two principal components, viz., polyamide and polyester constituents.

The polyamide comprises a saturated, linear aliphatic polyamide customary in the production of tubular packaging films, which has the general formula $\{NH-CO-R^1-CO-NH-R^2\}$, in which $R^1$ and $R^2$ are the same or different and are selected $-(CH_2)_n-$ wherein n is 2 to 7, for example, polyhexamethylene adipic acid amide ($R^1=(CH_2)_4$, $R^2=(CH_2)_6$). Alternatively, the polyamide can have the general formula $\{NH-R^3-CO\}$, $R^3=(CH_2)_z$, $z=2-7$, for example, $R^3=(CH_2)_4$ or $(CH_2)_6$, preferably polycaprolactam ($R^3=(CH_2)_5$). The polyamide can also comprise random copolyamides prepared from units of the above polymers and using adipic acid, azelaic acid, sebacic acid as well as terephthalic acid and diamines, such as hexamethylene diamine or trimethyl hexamethylene diamine. A preferred copolyamide is prepared from caprolactam, hexamethylene diamine and adipic acid. The polyamide constituent can also be present in the form of a mixture of various polyamides. Of the above-mentioned polyamides, polycaprolactam (polyamide 6) is particularly preferred. For the purposes of blow extrusion, polyamides having a relative viscosity in the range from about 2.5 to 4.5, particularly from 2.8 to 4.2, measured in sulfuric acid (96% strength / 20° C.) are used.

The polyester which is present in the polymer mixture of the casing material is a condensation product of diols with terephthalic acid and optionally additionally isophthalic acid. The amount of the isophthalic acid can be up to 20 mol % of the polyester. The diols particularly comprise aliphatic compounds corresponding to the formula $HO-(CH_2)_n-OH$ (n=2 to 6), such as ethylene glycol, 1,4-butylene glycol, 1,3-propylene glycol or hexamethylene glycol, and alicyclic compounds such as 1,4-cyclohexane dimethanol. Polybutylene terephthalate is particularly preferably used in the polymer mixture, the polymer having a mean melt viscosity customary for film extrusion.

The polyterephthalate or polyisophthalate added can be modified to a small extent with aliphatic dicarboxylic acids.

Although it is possible to have a proportion of polyester from 70 to 5% by weight in the polymer mixture, it has nevertheless been found that, in this range, a deterioration of film properties occurs at values less than 50% and greater than 25% by weight for the polyester proportion. In particular, film in this range of compositions, when extruded into tubing, tends to split before and during the stretching operation. This disadvantageous effect is not encountered at the remaining values of the concentration range. Thus, polyester proportions between 70% and 50% by weight, and between 25% and 5 % by weight are advantageous. In addition, polyester proportions between 65% and 50% by weight and between 25% and 5% by weight in the polymer mixture are particularly advantageous.

At the very low proportions of polyester, between 25% and 5 % by weight, particularly crease-free sausage casings are obtained which show good slip properties without the addition of an anti-blocking agent.

The polymer mixture can contain further additives, for example, dyes, pigments, and processing auxiliaries, which ensure a trouble-free production process.

Silicone oils, in particular polydialkyl siloxanes ($C_1$–$C_4$), have proved to be particularly advantageous additives, which are used in a quantity from 0.05% to 1.2% by weight, particularly from 0.1% to 0.6% by weight, based on the polymer mixture. Polydimethyl siloxane having a viscosity from 10 to 100,000 mm$^2$/s, particularly from 500 to 30,000 mm$^2$/s (23° C.) is a suitable polydialkyl siloxane. This additive has the unexpected effect of improving the slip properties of the film during the production thereof, without causing a disadvantageous acceleration of crystallization of the polymers before the stretching process.

The packaging film has a wall thickness ranging between 10 and 50 μm. It is preferably used in a biaxially oriented form. In the production of the film, the process steps known from the manufacture of polyamide films are used.

In a first step, the individual components are mixed. It is, however, also possible to carry out the mixing operation in the extrusion apparatus. The tubular pre-film which is extruded according to the film blowing process, is simultaneously biaxially stretched by inflating and drawing off. To obtain a thermally stable film, the film is heat-set in the usual manner after stretching. The film obtained has a thickness from 10 to 50 μm, particularly from 25 to 45 μm.

For packaging pasty foodstuffs, the tubular film is used in the form of sections, in a shirred form or in a curved form, as a so-called "ring". Shirring is effected by means of the customary shirring devices. In the course of pressing in the pasty fillings, the shirred tubing is deshirred. During the following preservation of the filling under the action of hot water, the uniform cross section of the packaging casing is maintained and after cooling, tightly filled, crease-free packages are obtained. The packaging casing thus shows an excellent resistance to deformation under the action of hot water and also an elastic recovery which is sufficient for the casing to fit closely to the cooled filling. Unexpectedly, these properties are even present at relatively large tubing diameters from 90 to 120 mm, such that the packaging casing is also suitable for use as a sausage casing for particularly big and heavy sausages.

The invention is explained in detail with reference to the following example.

EXAMPLE

A granular mixture composed of 78 parts by weight of polyamide 6 and 22 parts by weight of polybutylene terephthalate was plastified together with 0.3 part by weight of polydimethylsiloxane (viscosity 1,000 mm$^2$/s 23° C.), in an extruder at a temperature of about 240° C. and was then extruded through an annular die to form a tubing having a diameter of 30 mm. The tubing, which was kept amorphous by chilling with a cooling mandrel, was immediately afterwards heated to the stretching temperature by means of infrared lamps. With the aid of a gas filling in the interior of the tubing, the tubing was stretched in both directions, thereby reducing its thickness and increasing its surface area and was heat set in this state. After laying flat, the tubing, having a flat width of 145 mm and a thickness of 36 /mm, was wound up.

In order to test the resistance to deformation, a strip having a width of 1 cm was cut from the tubing in the transverse direction and was extended at 20° C. and also in water at 80° C., under a load of $K_1$. The load $K_1$ was calculated as follows:

$$K_1 = \frac{p \cdot r \cdot A}{d} = 18N$$

wherein:
p = internal pressure = 0.04 N/mm$^2$
r = half of diameter = 45 mm
d = thickness = 0.036 mm
A = cross section = 0.36 mm$^2$ The following applies to the change of circumference, if
$l_0$ = length of the test strip prior to extension
$l_1$ = length after loading with $K_1$ at 20° C.
$l_2$ = length after loading with $K_1$ at 80° C.

$$0.8 < \frac{l_1 - l_0}{l_2 - l_1} < 1.2$$

When the test strip was unloaded after the two extension procedures, the new length $l_3$ had values from $0.95.l_1$ to $0.98.l_1$.

What is claimed is:

1. A tubular packaging film suitable for use as a sausage casing, wherein said tubular film consists essentially of a polymer mixture of, on a 100 parts polymer basis:
   from about 30 parts to about 95 parts of a polyamide selected from the group consisting of homopolyamides, copolyamides, and mixtures thereof; and
   from about 70 parts to about 5 parts of a polyester having repeating units selected from the group consisting of terephthalic units and a mixture of terephthalic and isophthalic units acids.

2. A packaging film as claimed in claim 1, wherein said polyester is produced from a diol of the formula HO—R—OH, wherein R is selected from the group consisting of $(CH_2)hd n$ and

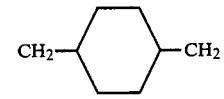

and wherein n is from 2 to 6.

3. A packaging film as claimed in claim 2, wherein R is $(CH_2)_4$.

4. A packaging film as claimed in claim 1, wherein said polyamide comprises units selected from the group consisting of (A) $-[NH-CO-(CH_2)_x-CO-NH-(CH_2)_y]-$ and
(B) $-[NH-CO-(CH_2)_z]-$ wherein x, y and z are integers from 2 to 7.

5. A packaging film as claimed in claim 4, wherein said polyamide contains units of $-NH-CO-(CH_2)_5-$.

6. A packaging film as claimed in claim 1, wherein said film is biaxially oriented, and wherein said mixture further contains from about 0.05 to about 1.2 parts per 100 parts polymer of a polysiloxane.

7. A packaging film as claimed in claim 6, wherein said polysiloxane is present in an amount of from about 0.07 to about 0.5 parts per 100 parts polymer.

8. A packaging film as claimed in claim 6, wherein said polysiloxane is polydimethyl siloxane having a viscosity of from about 10 to about 100,000 mm$^2$/s (23° C.).

9. A packaging film as claimed in claim 8, wherein the viscosity of said dimethyl siloxane is from about 500 to about 30,000 mm$^2$/s (23° C.).

10. A packaging film as claimed in claim 1, wherein the amount of said polyamide is from about 95 to about 75 parts and the amount of said polyester is from about 5 to about 25 parts.

11. A packaging film as claimed in claim 1, wherein the amount of said polyamide is from about 50 to about 30 parts, and the amount of said polyester is from about 50 to about 70 parts.

12. A packaging film as claimed in claim 1, wherein the amount of said polyamide is from about 35 parts to about 50 parts, and the amount of said polyester is from about 65 parts to about 50 parts.

13. A packaging film as claimed in claim 1, wherein said casing increases in circumference when filled with material at 20° C. and thereafter further increases in circumference when treated with water at 80° C., such that the ratio of circumference increase due to said filling to the increase due to said water treatment is from about 0.8 to about 1.2.

14. A packaging film as claimed in claim 1, wherein said film is shirred.

15. A packaging film as claimed in claim 1, wherein said mixture of terephthalic and isophthalic units contains at least about 80% terephthalic units.

16. A packaging film as claimed in claim 1, wherein said polyester is produced from a diol of the formula HO—R—OH, wherein R is selected from the group consisting of $(CH_2)_n$ and

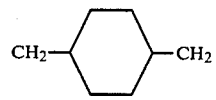

and wherein n is from 2 to 6; and
wherein the amount of said polyamide is from about 95 to about 75 parts and the amount of said polyester is from about 5 to about 25 parts.

17. A packaging film as claimed in claim 1, wherein said polyester is produced from a diol of the formula HO—R—OH, wherein R is selected from the group consisting of $(CH_2)_n$ and

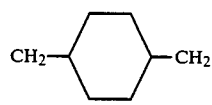

and wherein n is from 2 ot 6; and
wherein the amount of said polyamide is from about 50 to about 30 parts, and the amount of said polyester is from about 50 to about 70 parts.

18. A packaging film as claimed in claim 6, wherein said film has a wall thickness of from about 10 μm to about 50 μm.

* * * * *

UNITED STATES PATENT AND TRADEMARK OFFICE
CERTIFICATE OF CORRECTION

PATENT NO. : 4,659,599

DATED : Apr. 21, 1987

INVENTOR(S) : STRUTZEL, Hans

It is certified that error appears in the above—identified patent and that said Letters Patent is hereby corrected as shown below:

IN THE CLAIMS:

Column 4, line 46 (Claim 1) kindly delete "acids".

Column 4, line 50 (Claim 2) kindly delete "$(CH_2)$hd n" and insert instead -- $(CH_2)_n$ --.

Column 4, line 67 (Claim 5) before "-NH-" kindly insert a bracket -- [-NH- --.

Column 4, line 68 (Claim 5) after ")$_5$-" kindly insert a bracket -- )$_5$-] --.

Column 6, line 29 (Claim 17) kindly delete "ot" and insert instead -- to --.

Signed and Sealed this

Eighteenth Day of August, 1987

*Attest:*

DONALD J. QUIGG

*Attesting Officer*  *Commissioner of Patents and Trademarks*